United States Patent [19]

Brouard

[11] Patent Number: 5,000,793
[45] Date of Patent: Mar. 19, 1991

[54] METHOD OF MANUFACTURING A BUILDING ELEMENT BASED ON A HYDRAULIC BINDER, AN ELEMENT THUS OBTAINED, AND A BUILDING METHOD USING SUCH ELEMENTS

[76] Inventor: Jean C. Brouard, Les Bureaux, Saint-Lyé-la-Forêt 45170, France

[21] Appl. No.: 245,402

[22] PCT Filed: Nov. 26, 1987

[86] PCT No.: PCT/FR87/00472
§ 371 Date: Jul. 21, 1988
§ 102(e) Date: Jul. 21, 1988

[87] PCT Pub. No.: WO88/03916
PCT Pub. Date: Jun. 2, 1988

[30] Foreign Application Priority Data

Nov. 27, 1986 [FR] France ................ 8616577

[51] Int. Cl.$^5$ .......... E04C 1/10; E04C 1/06; B25B 3/00; E04B 2/54
[52] U.S. Cl. .............. 106/772; 106/778; 106/783; 52/257; 52/258
[58] Field of Search ........... 106/110, 772, 778, 783; 52/258, 279, 277, 252, 259, 257; 425/63, 177

[56] References Cited

U.S. PATENT DOCUMENTS

| 763,945 | 6/1904 | Whitmore | 52/259 |
| 839,782 | 12/1906 | Pauly et al. | 425/63 |
| 2,539,408 | 1/1951 | Ensign et al. | 106/110 |
| 2,696,102 | 0/1954 | Zagray | 52/259 |
| 3,069,278 | 12/1962 | Kimpell | 106/110 |
| 3,303,030 | 2/1967 | Preston | 106/110 |
| 3,534,518 | 9/1968 | Zagray | 52/258 |
| 4,353,746 | 10/1982 | Birchall et al. | 106/110 |

FOREIGN PATENT DOCUMENTS

| 505518 | 9/1951 | Belgium . |
| 385454 | 2/1923 | Fed. Rep. of Germany . |
| 1903347 | 9/1969 | Fed. Rep. of Germany . |
| 2032261 | 6/1971 | Fed. Rep. of Germany . |
| 2805523 | 7/1978 | Fed. Rep. of Germany . |
| 615791 | 1/1927 | France . |
| 915121 | 10/1946 | France . |
| 2311638 | 12/1976 | France . |
| 306575 | 12/1955 | Switzerland . |
| 2024887 | 1/1980 | United Kingdom . |

*Primary Examiner*—William R. Dixon, Jr.
*Assistant Examiner*—Carol Bonner
*Attorney, Agent, or Firm*—Browdy and Neimark

[57] ABSTRACT

A building element based on plaster which is manufactured by dry mixing sand and plaster, by dampening the mixture, by placing the damp mixture in a mold, and by compressing the mixture in the mold while the plaster hydrates in order to densify the crystal lattice of the plaster. The building element (10) includes self-alignment projections (14) on its top face (12) and a vertical groove (22) at one of its ends for the purpose of casting a liquid sealant, such as plaster.

9 Claims, 2 Drawing Sheets

METHOD OF MANUFACTURING A BUILDING ELEMENT BASED ON A HYDRAULIC BINDER, AN ELEMENT THUS OBTAINED, AND A BUILDING METHOD USING SUCH ELEMENTS

The invention relates to a method of manufacturing a building element based on a hydraulic binder, and in particular on plaster, to elements obtained by performing the method, and also to a building method using such elements.

Prefabricated building elements are already known which are made of plaster and which are used, in general, for lining walls and for making lightweight partitions. The drawback of these elements is their low mechanical strength.

Attempts have already been made to mix an inert fill, e.g. sand or fibers, with the plaster in order to increase the strength of such elements, however it has not been possible to increase strength sufficiently for such elements to be usable as elements in a load-carrying wall.

Further, elements based on plaster and made by prior manufacturing methods require a long drying time before they can be handled.

A particular object of the invention is to mitigate these drawbacks by proposing a plaster-based element whose mechanical strength is equivalent to that of ordinary grade concrete and whose hardness is equivalent to that of stone.

Another object of the invention is to provide a plasterbased building element which is capable of being handled and used immediately after it has been manufactured, without requiring prior drying.

Another object of the invention is to provide a plasterbased building element capable of being made from any type of plaster, including raw plaster or plaster of very ordinary quality.

The invention thus provides a method of manufacturing a building element based on a hydraulic binder, in particular plaster, characterized in that it consists in dry mixing plaster and an inert granular fill such as sand, in dampening said mixture by adding a quantity of water thereto which is substantially equal to or slightly greater than the quantity of water necessary for hydrating the plaster, or which is sufficient for obtaining maximum compactness of the mixture for a given compression energy, in immediately placing the damp mixture in a mold, and in compressing it in the mold for a predetermined period of time during which the plaster hydrates and the crystal lattice resulting from its hydrating densifies, then in extracting the element obtained in this way from the mold.

This method makes it possible to use: firstly plaster requiring no special precautions to be taken with respect to quality, grain size, setting speed, or expansion factor, although it is preferable for the expansion factor to be relatively high, and secondly a granular fill such as windblown sand, sea sand, laterite, etc. having a grain size appropriate to the final product which is to be obtained.

Because the quantity of water added to the mixture of plaster and sand or the like is low and corresponds substantially to the quantity required for hydrating the plaster, or as a function of the plaster content in the mixture to the quantity of water required for obtaining maximum compactness of the mixture for a given compression energy, a final product is obtained on unmolding which can be handled and used without requiring prior drying.

Further, since the plaster hydrates essentially while the damp mixture is being compressed in the mold, the expansion of the mixture due to the plaster hydrating is opposed by the compression applied thereto, thereby giving rise to considerablele densification and to preferential orientations in the crystal lattice of the plaster. This characteristic makes it possible to obtain a building element whose compression strength is about 150 kg/cm$^2$, for example. i.e. equivalent to that of concrete, while its hardness is equivalent to that of facing stone.

According to a characteristic of the method of the invention, the damp mixture is compressed in the mold in two opposite directions.

This provides an element which is more uniform, and whose compression strength is substantially constant over its entire height.

According to another characteristic of the method, the dry mixture comprises about 15% to about 40% by weight of plaster, with the plaster content varying as a function of the desired strength of the final product and of the range of grain sizes in the sand used.

According to yet another characteristic of the invention, the dampened mixture comprises about 20 to 25 parts of water by weight per 100 parts of plaster, with the water content being increased when the plaster content is low.

The duration of damp mixture compression in the mold lies between about 2 minutes and about 4 minutes at an ambient temperature of about 20° C. to about 40° C.

The method according to the invention is applicable to any other hydraulic binder (cement, lime) to which an expansion agent is added, if necessary.

The invention also provides a building element based on a hydraulic binder, and in particular on plaster, obtained by performing the above-described method and in the form of a hollow rectangular block, characterized in that its top face includes projections for longitudinal and transverse alignment and positioning, and its bottom face includes cavities for receiving the projections on the top face of an identical element, together with channels for passing a sealant, said channels communicating with said cavities.

When such a building element is made using the method of the invention, it has very high dimensional accuracy, of about 0.1 mm. The projections on its top face and the cavities in its bottom face make it possible to place it and to position it very accurately on a course of elements which has already been built, without it being necessary to provide mortar jointing between the elements in order to compensate for their dimensional tolerances.

An element in accordance with the invention preferably further includes a vertical groove at one of its ends into which a sealant may be cast, said groove opening out at its bottom end into the above-mentioned channels.

The invention also provides a building method using elements according to the invention, which method is characterized in that it consists in placing the elements end-to-end and on top of one another, with all of the elements being the same way round, the elements of one course being offset by one half length relative to the elements of an adjacent course; and after a course has been laid, in pouring a liquid sealant into the vertical grooves at the ends of the elements, said sealant being based on the hydraulic binder from which the elements are made.

This liquid sealant flows into the cavities of the bottom face of the element and fills them partially, thereby fixing said element to the elements in the course beneath it. The liquid sealant also fills the vertical grooves at the ends of the elements thus fixing together elements placed end-to-end in the same course. Since the building elements and the sealant are made using the same hydraulic binder, a very uniform overall structure is obtained which does not have preferred zones of weakness.

In particular, the invention makes it possible to manufacture building elements based on plaster and to use them immediately by implementing means which are simple and cheap, and it is therefore of particularly advantageous application in developing countries.

Other characteristics, details and advantages of the invention appear better from reading the following description given by way of example and made with reference to the accompanying drawings, in which.

Figure 1:
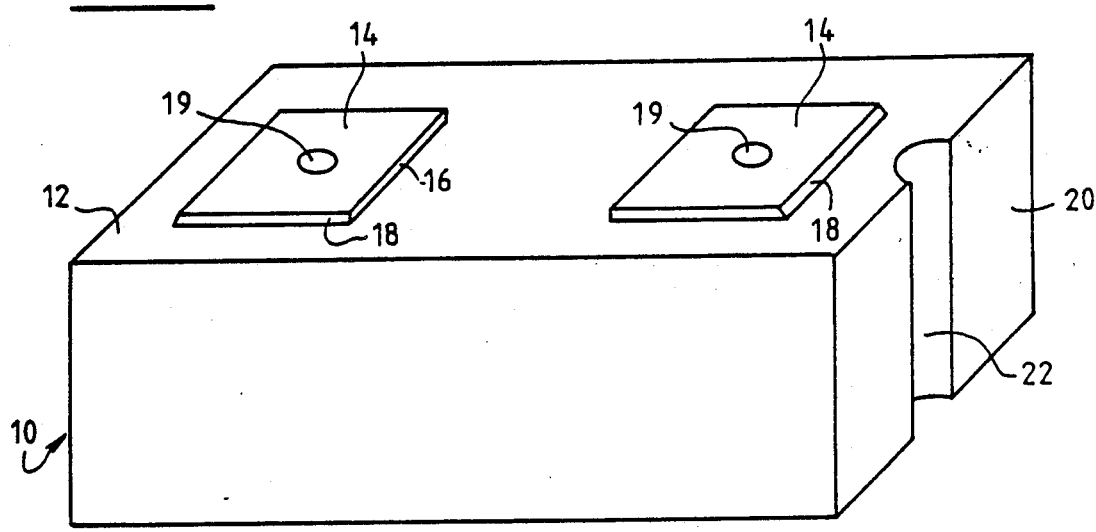
FIG. 1 is a diagrammatic perspective view of a building element in accordance with the invention.

As mentioned above, the method of the invention consists essentially in dry mixing a hydraulic binder such as plaster and an inert granular fill such as sand or gravel, in dampening said mixture with a predetermined minimum quantity of water, in immediately placing the damp mixture in a mold, and in compressing it in the mold while the plaster hydrates, then in extracting the resulting building element from the mold and either using it immediately or else storing it, depending on requirements.

There are no special requirements on the quality of the plaster used, indeed it may be raw plaster, e.g. a plaster that has been baked in the sun at low temperature, similarly there are no special requirements on its grain size, on its setting speed, or on its expansion factor, although a high factor is preferred.

The granular fill used is sand of unspecified quality, for example wind-blown sand, sea sand, or laterite, and there are no special requirement on grain size so long as it is less than about 15 mm to about 20 mm. Preferably, the grain size is selected to be less than about 3 mm if the end product is to be capable of being sawn.

The plaster and the granular fill, e.g. sand, are dry mixed, with the plaster content in said mixture being about 15% to about 40% by weight, depending on the final strength desired for the building element and on the range of grain sizes in the sand being used.

The next operation in the method consists in dampening said mixture of plaster and sand uniformly using a quantity of water which is slightly greater than the Proctor optimum, i.e. the water content which provides maximum compactness of the mixture for a given compression energy. This quantity of water is preferably equal to the Proctor optimum plus a very small quantity of wetting water which may be about 4% to 5% of the total quantity of water, for example. The water should be provided in the quantity required for enabling the plaster to hydrate and in sufficient quantity to obtain maximum compactness of the mixture on first compression.

By way of numerical example, the damp mixture comprises about 20 to 25 parts of water by weight per 100 parts of plaster, providing the plaster content is relatively high, with the quantity of water used being greater when the plaster content is low in order to ensure that the sand being used is wetted.

By way of comparison, the water content in normal methods of preparing plaster is generally about 80 parts water by weight per 100 parts plaster.

The damp mixture is immediately placed in a mold having the shape of the element to be obtained, which mold includes a bottom plate and a top plate capable of moving towards each other and connected to means enabling the damp mixture placed in the mold to be compressed during a sufficient period of time. These means may be a mechanical press or a hydraulic press, etc., suitable for developing a pressure inside the mold of about 30 kg/cm$^2$ to about 100 kg/cm$^2$.

The duration of the compression lies between about 2 minutes and about 4 minutes at an ambient temperature of about 20° C. to about 40° C., and varies as a function of said ambient temperature and of the composition of the mixture.

The following phenomena occur inside the mold:

The plaster begins to expand as soon as it comes into contact with the water. That is why it is important for the damp mixture to be placed in the mold as soon as possible after it has been dampened. To do this, the mold may be filled by a conveyor belt which transports a predetermined flow rate of dry plaster and sand mixture, and said mixture is dampened as it falls into the mold by an extremely fine spray of water without entraining air, for example using a mirror jet.

The damp mixture falling into the mold is subjected to the above-mentioned compression in two opposite directions as soon as the desired quantity of mixture has been placed in the mold. During said compression, the expansion of the plaster due to the plaster hydrating is opposed by the compression in the closed volume of the mold. This gives rise to considerable densification and to preferential orientations in the crystal lattice of the plaster, with crystals forming in all of the voids they can occupy. After the above-mentioned period has elapsed, compression is stopped and the molded element is immediately removed from the mold.

The compression and the resulting densification of the crystal lattice of the plaster make it possible to obtain a building element having extremely smooth surfaces, with dimensional accuracy of about 0.1 mm, with hardness equivalent to that of soft stone, i.e., a stone which has a hardness of from 50 to 250 kg/cm$^2$ and with compression strength which varies as a function of the composition of the mixture used between 50 kg/cm$^2$ and 200 kg/cm$^2$.

The element ejected from the mold is a hard product which can be handled directly without taking special precautions, which can be used immediately for building, and which is not sensitive to freezing.

The mold used must be made of thick strong steel and should not include parts requiring lubrication.

The method of the invention can be used to manufacture building elements of various forms, for example hollow rectangular blocks such as breeze- or cinderblocks, plane slabs, roofing tiles (with reinforcing fibers being added to the mixture, e.g. glass wool fibers), etc.

Figure 2:
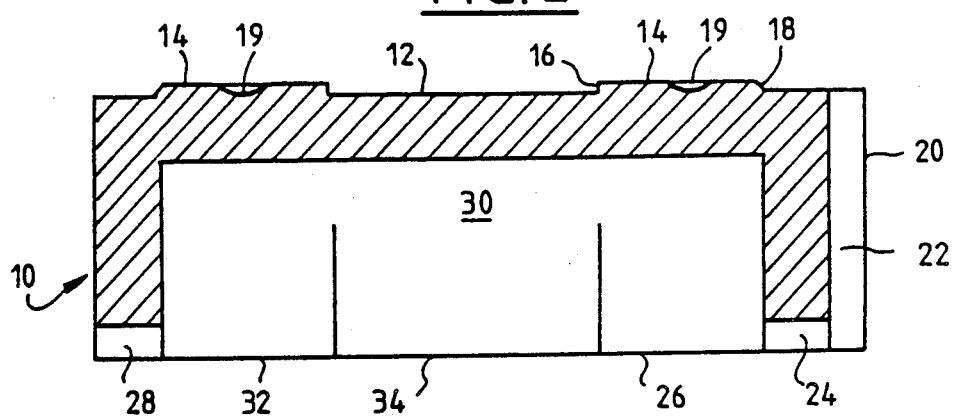
FIG. 2 is a longitudinal section view through said element.
Figure 3:
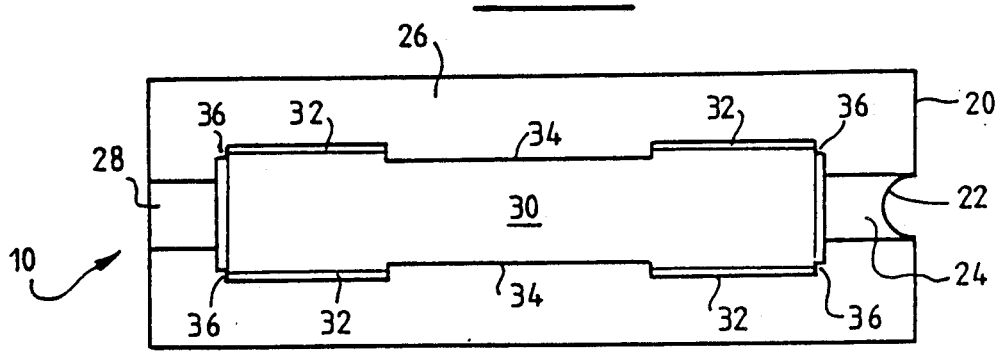
FIG. 3 is a view of the bottom face of said element.

Reference is now made to FIGS. 1 to 3 which show a building element in accordance with a preferred embodiment of the invention.

This element is designated overall by reference 10, it is in the form of a hollow rectangular block and includes two low projections 14 on its top face, said projections being square in shape, for example. In order to facilitate positioning and self-alignment of the elements with one another, two of the side faces 16 of the projections 14 may be vertical and accurately perpendicular to the top face 12 of the element 10, while the other two side faces 18 of each projection are sloping.

As shown in FIGS. 1 and 2, the top face of each projection 14 may include a recess 19 in the form of a spherical cap, thereby making it possible during molding to accurately obtain the desired shapes for the side faces 16 and 18 of the projections.

One of the longitudinal end faces 20 of the element 10 has a vertical groove 22 extending over its entire height, with the bottom end of the groove opening out into a longitudinal groove 24 in the bottom face of the element 10. At the other end of the bottom face 26 of the element 10, there is another longitudinal groove 28 in alignment with the groove 24.

The two end grooves 24 and 28 of the bottom face of the element 10 open out into a cavity 30 whose longitudinal sides have two set-backs 32 at their ends corresponding in size to the longitudinal sides of the projections 14, with these setbacks being interconnected longitudinally by straight edges 34 which project towards each other and they are interconnected transversely by abutments 36 such that the projections 14 on the top face 12 of an element 10 can be placed and positioned exactly in the housings defined by the sides 32 and 34 and the abutments 36 of the bottom edges of the cavity 30 of a different element.

Figure 4:
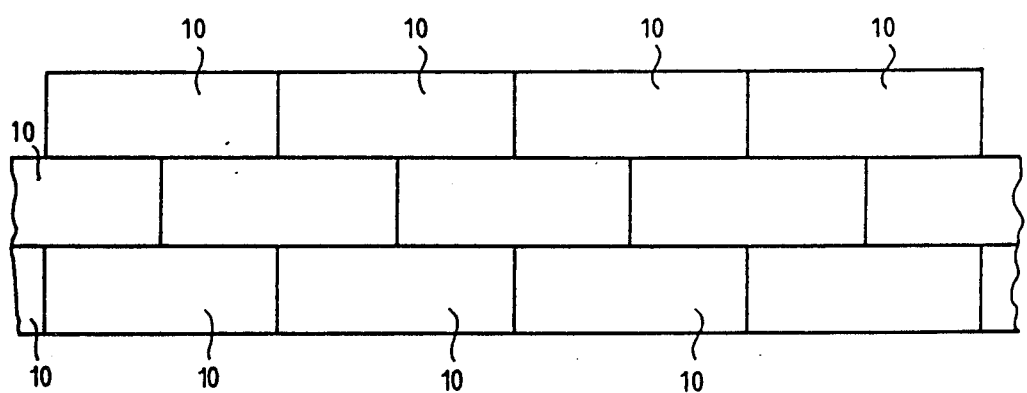
FIG. 4 is a view of a portion of a wall built using elements of the invention.
Figure 5:
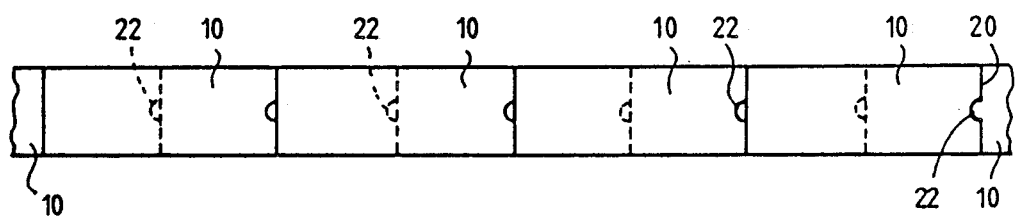
FIG. 5 is a plan view of said wall portion.

Elements of the invention are placed end-to-end and on top of one another as shown in FIGS. 4 and 5 in order to build a straight wall.

The portion of wall shown in FIG. 7 comprises three courses of elements 10 placed end-to-end, with all the elements being the same way round and with the elements of each course being offset by one half length relative to the elements of the adjacent courses.

The elements 10 for constituting one course are placed directly on the elements 10 of the course below, without interposing any mortar jointing. When the course is completed, a liquid sealant, such as very liquid plaster, is poured into the vertical grooves 22 at the ends of the elements in this course. The liquid plaster poured into a vertical groove 22 penetrates into the cavity 30 of said element via the groove 24 in its bottom face 26 and covers the projections 14 of the corresponding elements in the course beneath. The liquid plaster poured into the vertical groove 22 also passes via the horizontal groove 28 of the element situated at the same level and against which the end face 20 of the first element is placed. After a first pass in which the vertical grooves 22 of the elements in a course are filled, a second pass may be performed in order to fill these grooves up completely, since the plaster poured in during the first pass will have partially filled the cavities 30 in the elements.

The binding obtained between the elements is extremely strong since, on setting, the plaster sealant binds in a very intimate manner with the plaster constituting the elements 10.

Elements 10 according to the invention may naturally be mounted at right angles to each other on reaching a corner of a building.

Further, by making the elements 10 open at their longitudinal ends, it is possible to form guttering or to use such elements as lost casing for beams.

The method of the invention is applicable to any hydraulic binder (plaster, cement, lime). If the expansion factor of the binder during hydration is not sufficient, an expansion agent is added thereto which acts either in combination with the hydraulic binder, or else independently therefrom, in order to ensure that the mixture expands in the presence of water during molding under pressure, thereby obtaining a molded product whose mechanical characteristics are greatly improved.

Such expansion agents are well known to the person skilled in the art. For cements, it is possible to use, for example, Candelot salt (calcium sulfo-amulinate), or calcium silicates. For plaster, it is possible to use gympsum, which is also a setting accelerator.

I claim:

1. A method of manufacturing a building element comprising dry mixing a hydraulic binder chosen among plaster and cement and an inert granular fill mixture, dampening said mixture by adding a quantity of water thereto which is substantially equal to or slightly greater than the quantity of water corresponding to the Proctor optimum of the mixture, immediately placing the damp mixture in a mold, and compressing it in the mold for a sufficient period of time necessary for the binder to hydrate and for the resulting crystal lattice to densify, and removing molded mixture from the mold.

2. A method according to claim 1, wherein the damp mixture is compressed in the mold, in two opposite directions.

3. A method according to claim 1, wherein the dry mixture consists essentially of 15% to 40% by weight hydraulic binder and 85% to 60% by weight of inert fill.

4. A method according to claim 1, wherein the grain size of the inert fill is less than 20 mm.

5. A method according to claim 4, wherein said grain size is less than 3 mm.

6. A method according to claim 1, wherein the damp mixture comprises about 20 to 25 parts by weight of water per 100 parts by weight of hydraulic binder.

7. A method according to claim 1, wherein the binder is plaster, and the duration of compression on the mold is between about 2 minutes and about 4 minutes at an ambient temperature of about 20° to 40° C.

8. The method according to claim 1 wherein said inert fill is selected from the group consisting of sand and laterite.

9. The method according to claim 1 wherein the strength of the densified crystal lattice is from 50 to 200 kg/cm$^2$ wherein the hydraulic binder is plaster.

* * * * *